(12) United States Patent
Carlton et al.

(10) Patent No.: US 10,521,121 B2
(45) Date of Patent: Dec. 31, 2019

(54) APPARATUS, SYSTEM AND METHOD FOR THROTTLING A RATE AT WHICH COMMANDS ARE ACCEPTED IN A STORAGE DEVICE

(71) Applicant: INTEL CORPORATION, Santa Clara, CA (US)

(72) Inventors: David B. Carlton, Oakland, CA (US); Xin Guo, San Jose, CA (US); Yu Du, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 117 days.

(21) Appl. No.: 15/394,653

(22) Filed: Dec. 29, 2016

(65) Prior Publication Data

US 2018/0188952 A1  Jul. 5, 2018

(51) Int. Cl.
*G06F 12/02*  (2006.01)
*G06F 3/06*   (2006.01)

(52) U.S. Cl.
CPC .......... *G06F 3/061* (2013.01); *G06F 3/0659* (2013.01)

(58) Field of Classification Search
None
See application file for complete search history.

(56) References Cited

U.S. PATENT DOCUMENTS

| | | | |
|---|---|---|---|
| 9,529,668 B2 | 12/2016 | Wakchaure et al. | |
| 2010/0217888 A1* | 8/2010 | Ukita | H04L 47/12 709/234 |
| 2011/0185079 A1* | 7/2011 | Gershinsky | H04L 47/10 709/233 |
| 2017/0295112 A1* | 10/2017 | Cheng | H04L 12/6418 |
| 2018/0059976 A1* | 3/2018 | Helmick | G06F 3/0625 |

OTHER PUBLICATIONS

Marks, K., "An NVM Express Tutorial", Dell, Inc., Flash Memory Summit 2013, Santa Clara, CA, Total 92 pp.

(Continued)

*Primary Examiner* — Charles Rones
*Assistant Examiner* — Ryan Dare
(74) *Attorney, Agent, or Firm* — Konrad Raynes Davda & Victor LLP; David W. Victor

(57) ABSTRACT

Provided are an apparatus, system and method for apparatus, system and method for throttling an acceptance rate for adding host Input/Output (I/O) commands to a buffer in a non-volatile memory storage device. Information is maintained on an input rate at which I/O commands are being added to the buffer and information is maintained on an output rate at which I/O commands are processed from the buffer to apply to execute against the non-volatile memory. A determination is made of a current level of available space in the buffer and an acceptance rate at which I/O commands are added to the buffer from the host system to process based on the input rate, the output rate, the current level of available space, and an available space threshold for the buffer to maintain the buffer at the available space threshold. I/O commands are added to the buffer to process based on the acceptance rate. The I/O commands are accessed from the buffer to process to execute against the non-volatile memory.

25 Claims, 5 Drawing Sheets

(56) References Cited

OTHER PUBLICATIONS

DSR, "Introduction to NVMe Technology", [online], [Retrieved on Dec. 8, 2016]. Retrieved from the Internet at <URL: https://www.osr.com/nt-insider/2014-issue4/introduction-nvme-technology/>, © 2016 OSR Open Systems Resources, Inc., Total 3 pp.

Wikipedia, "PID Controller", [online], [Retrieved on Dec. 8, 2016]. Retrieved from the Internet at <URL: https://en.wikipedia.org/w/index.php?title=PID_controller&printable=yes>, page last modified on Nov. 3, 2016, at 21:54. Total 12 pp.

Solid State Drives—Memory Storage | Samsung US, downloaded from the Internet Archive at https://web.archive.org/web/20161112035200/http://www.samsung.com/us/computing/memory-storage/solid-state-drives/s/_/n-10+11+hv22y+zq29m on Jul. 22, 2019, Page dated Nov. 2016, pp. 5.

Intel Sold State Drives, downloaded from the Internet Archive at https://web.archive.org/web/20161220141005/http://www.intel.com/content/www/us/en/solid-state-drives/solid-state-drives-ssd.html on Jul. 22, 2019, Page dated Dec. 20, 2016, pp. 9.

\* cited by examiner

Logical-to-Physical Address Table Entry

Acceptance Rate Information

Availability Thresholds

APPARATUS, SYSTEM AND METHOD FOR THROTTLING A RATE AT WHICH COMMANDS ARE ACCEPTED IN A STORAGE DEVICE

TECHNICAL FIELD

Embodiments described herein generally relate to an apparatus, system and method for apparatus, system and method for improving quality of service in a storage device.

BACKGROUND

Solid state storage devices (for example, solid state drives or SSDs) may be comprised of one or more packages of non-volatile memory dies, where each die is comprised of storage cells, where storage cells are organized into pages and pages are organized into blocks. Each storage cell can store one or more bits of information. Input/Output (I/O) commands from a host system, for example, write commands are buffered in a temporary storage (buffer) in the SSD storage device before being processed against memory or storage cells. However, given the variance in the rate at which I/O commands are added and processed from the buffer, the buffer may become full. In such case, the storage device can no longer accept I/O commands, which may result in long latency from the host's perspective while commands are processed from the buffer to make space for new I/O commands.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

There is a need in the art for improved techniques for managing the buffer in a storage device to optimize I/O command processing and transfer.

Described embodiments provide techniques for throttling an acceptance rate at which I/O commands are accepted into a buffer of a non-volatile memory storage device to prevent the buffer from becoming full and not being able to accept further host I/O commands. Operations are optimized by throttling or slowing the rate at which I/O commands are pulled and added to the buffer to retain a threshold amount of available space in the buffer to handle variances in the rate at which commands are inputted and processed from the buffer.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
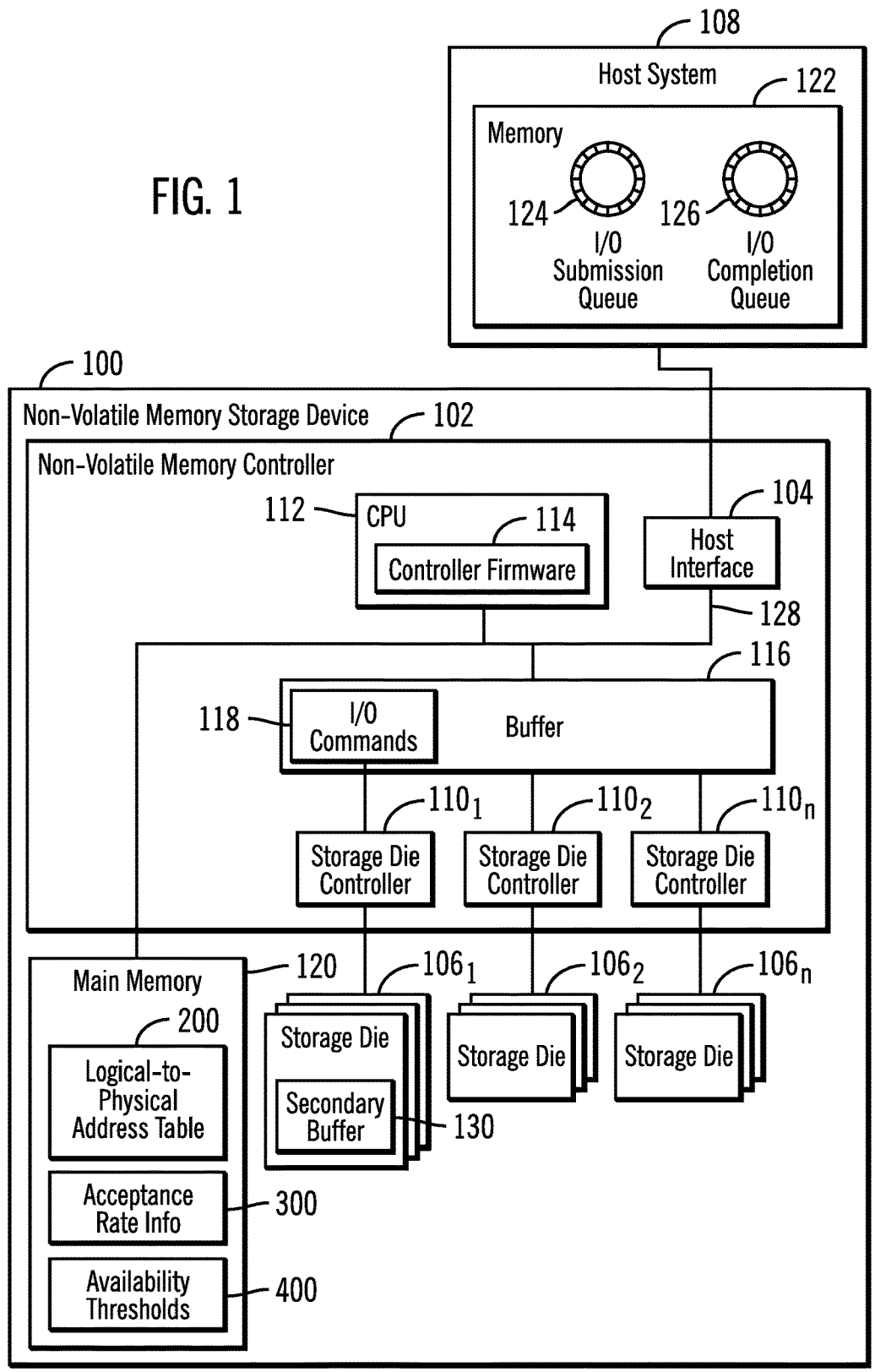
FIG. 1 illustrates an embodiment of a non-volatile memory storage device.

FIG. 1 illustrates an embodiment of a non-volatile memory storage device 100 having a non-volatile memory controller 102, including a host interface 104 to transfer blocks of data and I/O commands between a plurality of groups of storage dies $106_1$, $106_2$ ... $106_n$, comprising a non-volatile memory of storage cells that may be organized into pages of storage cells, where the pages are organized into blocks, and a connected host system 108. The non-volatile memory storage device 100 includes storage die controllers $110_1$, $110_2$ ... $110_n$, that manage read and write requests to blocks of data in pages of storage cells to groups of the storage dies $106_1$, $106_2$ ... $106_n$, and the transfer of data between a buffer, such as a buffer 116, and the storage dies $106_1$, $106_2$ ... $106_n$.

The non-volatile memory storage device 100 may function as both a memory device and/or a storage device in a computing system, and may be used to perform the role of volatile memory devices and disk drives in a computing system. In an embodiment, the non-volatile memory storage device 100 may comprise a solid state drive (SSD) of NAND storage dies 106.

The non-volatile memory controller 102 may include a central processing unit (CPU) 112 implementing controller firmware 114 managing the operations of the non-volatile memory storage device 100; and a non-volatile buffer 116 comprising a non-volatile memory device to cache and buffer transferred Input/Output ("I/O") commands 118 and data between the host 108 and storage dies $106_1$, $106_2$ ... $106_n$. The buffer 116 may comprise a Static Random Access Memory (SRAM) or other suitable memory storage device. The buffer 116 may comprise volatile memory or non-volatile storage. A secondary buffer 130 may be implemented in the storage dies $106_1$, $106_2$ ... $106_n$ or another memory device in which I/O commands 118 are buffered when the buffer 116 available free space falls below a threshold.

A main memory 120 stores a logical-to-physical address table 200 providing a mapping of logical addresses to which I/O requests are directed and physical addresses in the storage dies $106_1$, $106_2$ ... $106_n$ at which the data for the logical addresses are stored The logical addresses may comprise logical block address (LBAs) or other logical addresses known in the art. The main memory 120 further maintains acceptance rate information 300 indicating information used by the firmware 114 to determine a rate at which the controller firmware 114 may accept, e.g., poll or access, I/O commands and availability thresholds 400 of available space in the buffer 116.

The storage dies $106_1, 106_2 \ldots 106_n$ may comprise electrically erasable and non-volatile memory cells, such as NAND dies (e.g., single level cell (SLC), multi-level cell (MLC), triple level cell (TLC) NAND memories, etc.), a ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAIVI), Spin Transfer Torque (STT)-MRAM, SRAM, and other electrically erasable programmable read only memory (EEPROM) type devices.

The buffer 116 and main memory 120 may comprise volatile memory devices, such as an SRAM, DRAM, etc. Alternatively, the buffer 116 and main memory 120 may comprise non-volatile memory devices, and may comprise the same or different types of memory devices. The storage dies $106_1, 106_2 \ldots 106_n$ provide more storage space than the buffer 116, which provides a cache for the storage dies $106_1, 106_2 \ldots 106_n$, and the main memory 120, which stores information used for processing I/O requests.

In one embodiment, the storage dies $106_1, 106_2 \ldots 106_n$ comprise NAND storage, the buffer 116 may comprise an SRAM, and the main memory 120 comprises a Dynamic Random Access Memory (DRAM), which may be battery backed-up, or 3D Xpoint (crosspoint) memory.

The host system 108 includes a memory 122 having an I/O submission queue 124 including I/O commands from host 108 applications for the non-volatile memory storage device 100 and an I/O completion queue 126 that the firmware 114 writes to when completing processing an I/O command 118 from the submission queue 124. In one embodiment, the controller firmware 114 may return complete to an accessed I/O command 118 in response to storing the I/O command 118 in the buffer 116. In certain embodiments, the host system 108 and non-volatile memory storage device 100 may communicate using the Non-Volatile Memory Express (NVMe) protocol (this specification is available at http://www.nvmexpress.org). The firmware 114 may access/pull I/O commands 118 from the I/O submission queue 124 periodically at a determined acceptance rate at which I/O commands 118 are to be accepted into the non-volatile memory storage device 100.

The host interface 104 connects the non-volatile memory storage device 100 to a host system 108. The non-volatile memory storage device 100 may be installed or embedded within the host system 108, such as shown and described with respect to element 708 or 710 in FIG. 7, or the non-volatile memory storage device 100 may be external to the host system. The host interface 104 may comprise a bus interface, such as a Peripheral Component Interconnect Express (PCIe) interface, Serial AT Attachment (SATA), Non-Volatile Memory Express (NVMe), etc.

The CPU 112, host interface 104, and buffer 116 may communicate over one or more bus interfaces 128, such as a PCIe or other type of bus or interface. Data may be transferred among the host interface 104, CPU 112, and buffer 116 over the bus 128 using Direct Memory Access (DMA) transfers, which bypass the CPU 112. Alternatively, the CPU 112 may be involved in transferring data among the host interface 104, buffer 116, and storage dies $106_1, 106_2 \ldots 106_n$ over the bus 128. In FIG. 1, the connection between the units is shown as a bus 128. In alternative embodiments the connection among any of the components 104, 112, 116, and 120 may comprise direct lines or paths and not a shared bus.

Figure 2:
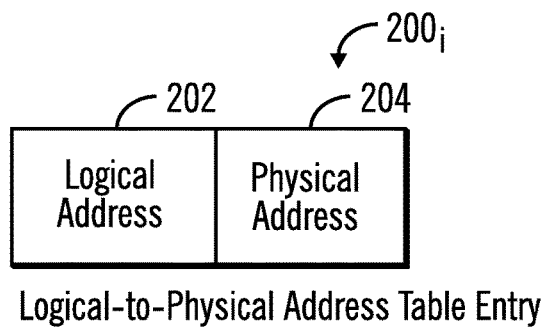
FIG. 2 illustrates an embodiment of a logical-to-physical address table entry.

FIG. 2 illustrates an embodiment of an entry $200_i$ in the logical-to-physical address table 200 that provides a logical address 202 and a corresponding physical address 204 in the storage dies $106_1, 106_2 \ldots 106_n$ at which data for the logical address 202 is stored. In certain embodiments, the logical address 202 may not comprise a separate field 202 in the entry $200_i$ and instead the logical address may comprise the index value into the logical-to-physical address table 200.

Figure 3:
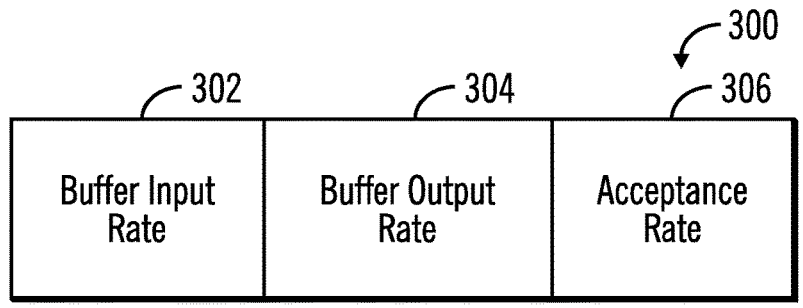
FIG. 3 illustrates an embodiment of acceptance rate information.

FIG. 3 illustrates an embodiment of acceptance rate information 300 including a buffer input rate 302 indicating a measured rate at which I/O commands 118 are transferred from the I/O submission queue 124 to the buffer 116; a measured buffer output rate 304 indicating a rate at which the storage die controllers $110_1, 110_2 \ldots 110_n$ pull I/O commands 118 from the buffer 116 to process against the storage dies $106_1, 106_2 \ldots 106_n$; and an acceptance rate 306 at which I/O commands 118 are accepted into the buffer 116, which may be calculated from a current available or amount of free space in the buffer 116 and the input 302 and output 304 rates to the buffer 116.

The acceptance rate 306 may be decreased if the buffer 116 available space reaches a low threshold so that the amount of free space does not fall below the low threshold, such as by reducing the acceptance rate 306 below the buffer output rate 304 so that I/O commands 118 are consumed at a higher rate than the rate at which they are added to the buffer 116 to increase the amount of available free space in the buffer 116. If the available space in the buffer 116 falls below a high threshold, e.g., 80%, 90%, etc., the acceptance rate 306 may be increased so that the output rate 304 is less than the input rate 302 to allow the buffer 116 to fill more and to improve latency experienced by the host system 108.

In certain embodiments, the controller firmware 114 may implement a proportional-integral-derivative controller (PID controller) to provide a control loop feedback mechanism to calculate an adjustment to the acceptance rate 306 based on the current available free space in the buffer 116 and the input 302 and output 304 rates.

Figure 4:
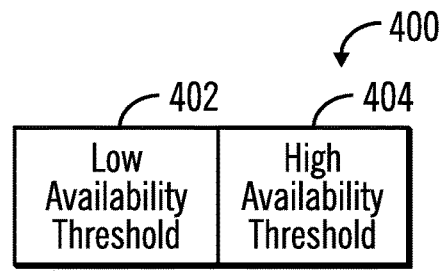
FIG. 4 illustrates an embodiment of availability thresholds.

FIG. 4 illustrates an embodiment of availability thresholds 400 the controller firmware 114 uses to determine when to use the secondary buffer 130, which in certain embodiments is implemented in the storage dies $106_1, 106_2 \ldots 106_n$, and includes a low availability threshold 402 and high availability threshold 404. The low availability threshold 402 indicates a point at which the available free space in the buffer 116 reaches a lowest threshold. At this point, the acceptance rate 306 is reduced in order to reduce the inflow to the buffer 116 to allow space to be freed so as to avoid the buffer 116 from becoming full and having to turn away I/O commands 118. The high availability threshold 404 is greater than the low availability threshold 402 and indicates that the buffer 116 has more free/available space than at the point of the low availability threshold 402. The high availability threshold 404 may be used to determine when I/O commands 118 temporarily buffered in the secondary buffer 130 may be copied back to the buffer 116 to be processed. There may be additional thresholds used to determine throttle actions to increase or decrease the acceptance rate 306 based on the input rate 302, output rate 304 and availability of free space at the buffer 116.

In certain embodiments, the availability thresholds 402, 404 may be expressed as a percent of free space available in the buffer 116, where the low availability threshold 402 may comprise 70%, 80%, 90%, etc., and the high availability threshold may comprise a lower percentage, e.g., 50%, 60%, etc. In further embodiments, the availability thresholds 402, 404 may be expressed in terms of amount or number of I/O commands 118 in the buffer 116.

In the described embodiments, the secondary buffer 130 is implemented in the storage dies $106_1, 106_2 \ldots 106_n$. In an alternative embodiment, the secondary buffer 130 may be implemented in another non-volatile memory device in the non-volatile memory storage device 100, such as a battery backed-up DRAM, etc.

In one embodiment where the storage dies $106_1, 106_2 \ldots 106_n$ comprise NAND dies, the secondary buffer 130 may be implemented by programming the storage cells in the storage dies $106_1, 106_2 \ldots 106_n$ implementing the secondary buffer 130 with a fewer number of bits than the storage cells used for storing data. For instance, if the storage dies $106_1, 106_2 \ldots 106_n$ comprise multi-level cell (MLC) NAND dies, triple level cell (TLC) NAND, and so on, then each of the storage cells that are capable of storing multiple bits. However, those storage dies $106_1, 106_2 \ldots 106_n$ storing the secondary buffer 130 may be programmed with only one bit per cell, less than permitted, which is substantially faster than programming the MLC NAND storage cells with multiple bits per cell. In this way, when the secondary buffer 130 is implemented in the storage dies $106_1, 106_2 \ldots 106_n$, the secondary buffer 130 may transfer data at a faster rate than the other regions of the storage dies $106_1, 106_2 \ldots 106_1$, at which data is being transferred for the processed I/O commands 118. During initialization, the controller firmware 114 may program the storage die controllers $110_1, 110_2 \ldots 110_n$ to program a different number of bits in the storage cells of the storage dies $106_1, 106_2 \ldots 106_n$ for the secondary buffer 130 versus those regions storing host data.

In certain embodiments, the controller firmware 114 wants to maintain sufficient available space in the buffer 116, such as 70%, 80%, 90%, etc., so that new commands may be received, even if that requires reducing the acceptance rate 306 to throttle or slow the inflow of I/O commands to the buffer 116. If I/O commands 118 cannot be sent to the buffer 116 because it is full, then they remain in the I/O submission queue 124. In such case where the buffer 116 is full, the command service time is dictated by the slower output rate to transfer data between the buffer 116 and storage dies $106_1, 106_2 \ldots 106_n$. Described embodiments may throttle the acceptance rate at which commands are accepted into the buffer 116 to maintain free space in the buffer 116 so commands are always accepted. This allows for reliable service times without slowing down the overall throughput at the non-volatile memory storage device 100. The described embodiments throttle the input rate 302 so that the input rate 302 matches the output rate 304 at which I/O commands 118 are processed. Maintaining a minimum amount of available space in the buffer 116 accommodates variability in the rate at which I/O commands are inputted into the buffer 116 and processed from the buffer 116, so that the overall latency may remain constant.

Figure 5:
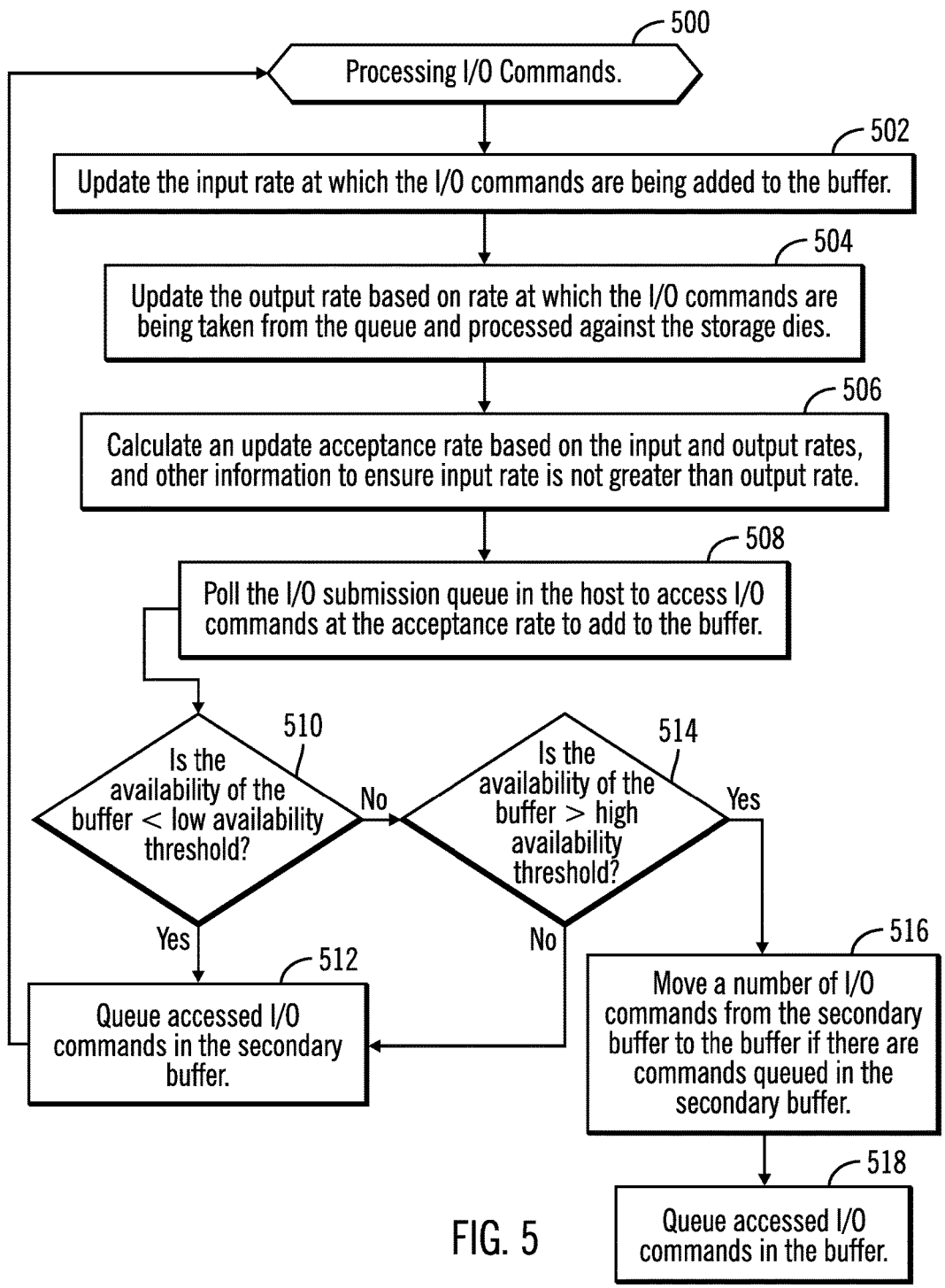
FIG. 5 illustrates an embodiment of operations to control the flow of I/O commands to a buffer in the non-volatile memory storage device.

FIG. 5 illustrates an embodiment of operations performed by the controller firmware 114 to process I/O commands 118. Upon initiating processing of I/O commands 118, which the firmware 114 pulls from the host I/O submission queue 124, the buffer input rate 302 is updated (at block 502) upon periodically measuring a rate at which the I/O commands are added to the buffer 116, which may comprise a number of I/O commands 118 added per unit of time. The buffer output rate 304 is updated (at block 504) based upon periodically measuring a rate at which the storage die controllers $110_1, 110_2 \ldots 110_n$ access I/O commands 118 from the buffer 116, which may comprise a number of I/O commands 118 processed per unit of time. The controller firmware 114 may use a PID controller algorithm or other algorithm to update (at block 506) the acceptance rate 306, at which I/O commands 118 are to be added to the buffer 116, or pulled from the I/O submission queue 124, based on the buffer input rate 302, output rate 304, available space in the buffer 116, threshold goals of free space, and/or other factors, etc. The controller firmware 114 may poll (at block 508) the I/O submission queue 124 in the host 108 to access I/O commands 118 at the calculated acceptance rate 306 to add to the buffer 116.

In a PID controller algorithm embodiment, the input rate 302/output rate 304 relates to the derivative (D) part of the PID algorithm where the difference between the input 302 and output 304 rates determine the rate at which free space is increasing or decreasing relative to a desired set point of buffer free space. Setting the acceptance rate 306 based on this derivative, e.g., input rate 302/output rate 304, of free space comprises the derivative (D) part of the PID algorithm.

The proportional (P) part of the PID feedback may consider the current amount of free space and adjust the acceptance rate 306, or amount of throttling, proportionally to how far the free space in the buffer 116 is from that desired level at that time (i.e., not considering rate of change).

The integral (I) part of feedback may relate to an additional input or factor that is considered to determine why the buffer 116 differs from the target thresholds notwithstanding the proportional and integral feedbacks. The longer time the buffer 116 experiences an error in being off target, the more time will be spent adjusting the acceptance rate 306 to reach the target level. In such PID algorithms, all the proportional, integral, and derivative factors may be determined to adjust the acceptance rate 306 to remain close to target goals for the buffer 316, in addition to those described with respect to block 506 in FIG. 5.

In alternative embodiments, different techniques other than PID algorithms, may be used to consider the input 302 and output 304 rates for the buffer 116 to determine the acceptance rate 306 for the buffer 116.

The controller firmware 114 determines (at block 510) whether the availability, i.e., free space, of the buffer 116 is less than the low availability threshold 402. If so, then free space is considered too low, and the accessed I/O commands 118 are added to the secondary buffer 130 to alleviate overcrowding in the buffer 116. If (at block 510) the availability of the buffer 116 is not below the low availability threshold 402 and still not greater than the high availability threshold 404 (at block 512), then the I/O commands 118 are queued (at block 512) in the secondary buffer 130. If (at block 514) the availability, i.e., free space, in the buffer 116 is greater than the high availability threshold 404, then the controller firmware 114 may move (at block 516) a number of I/O commands from the secondary buffer 130 back to the buffer 116 if there are commands queued in the secondary buffer 130. The number of commands moved back to the buffer 116 from the secondary buffer 130 may comprise a sufficient number of commands to return the buffer availability 116 to the low availability threshold 402 or some availability above the low availability threshold 402. The I/O commands 118 accessed from the host I/O submission queue 124 are queued (at block 518) in the buffer 116.

Figure 6:
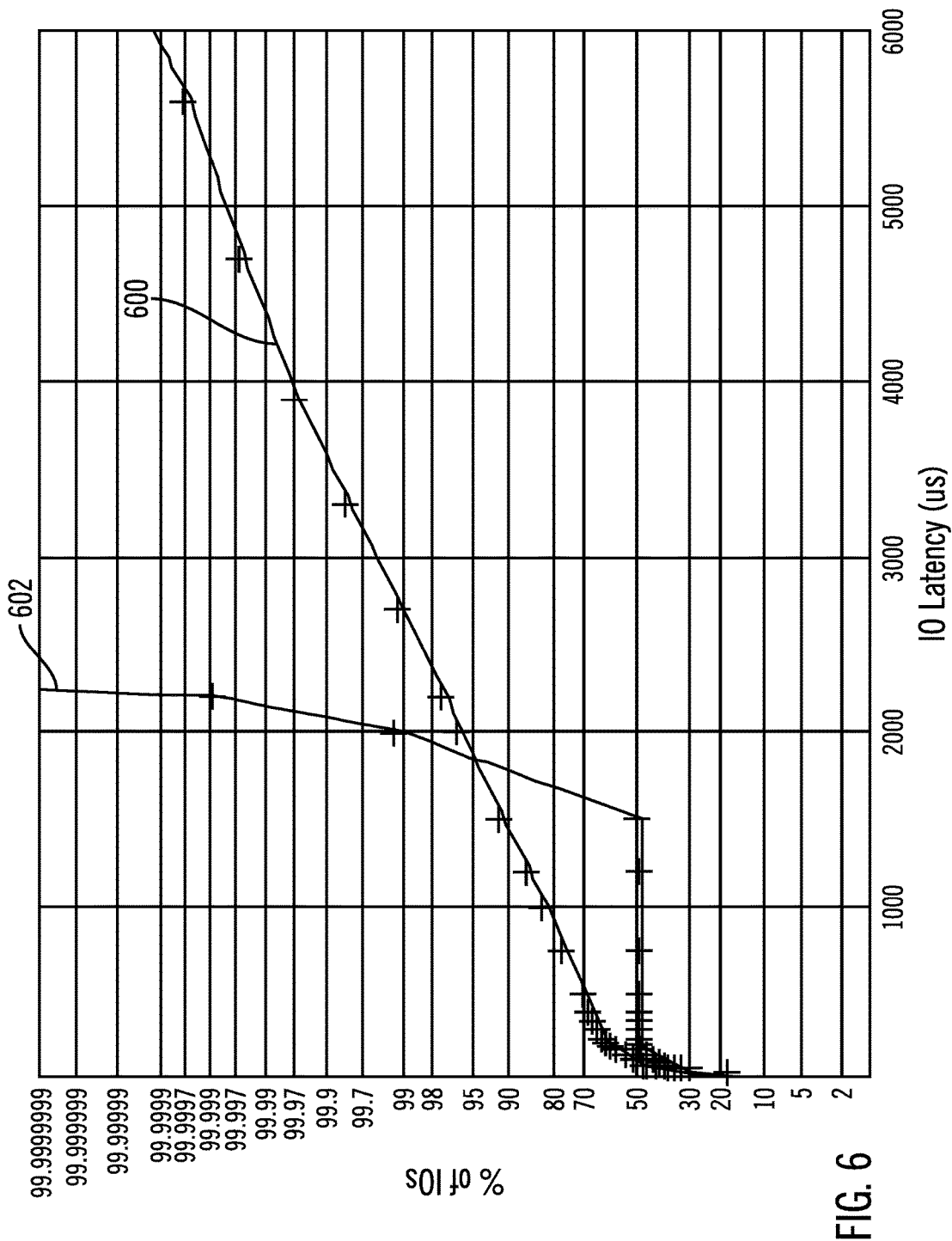
FIG. 6 illustrates a plot line showing the I/O latency for different percentages of commands with and without the described embodiments.

FIG. 6 illustrates a plot line 600 showing the distribution of the completion or I/O latency in microseconds (μs) of percentiles of I/O commands without using the described embodiments for throttling the flow of I/O commands. For the plot line 600, when the buffer 116 becomes full, the completion time for a small percentage of commands of commands, above 5%, can have a latency greater than 2000 μs and up to 6000 μs. The latency increases as a result of a small percentage of the I/O commands remaining at the host 108 unable to be added to the buffer 116 while the buffer is full.

FIG. 6 further shows a plot line 602 of the I/O latency when the described embodiments are utilized to throttle the acceptance of I/O commands into the buffer 116. With the described embodiments, as shown with plot line 602, many of the commands, from the $50^{th}$ to the $95^{th}$ percentile, take longer to complete, i.e., have a higher latency, than without the described embodiments as shown in plot line 600, but fewer commands in the upper percentiles (from 95-99 percentile) take more than 2000 μs to complete with the throttling. Plot line 600 generated without the described embodiments shows how a small percentage of commands can take up to 6000 μs to complete when the described throttling embodiments are not used. With the described embodiments, and as shown in FIG. 6, there is a tradeoff of having the majority of commands finish a bit slower than without using the described throttling embodiments, while guaranteeing that no command finishes with the very high latency experienced for a small percentage of commands without using the described throttling embodiments.

Figure 7:
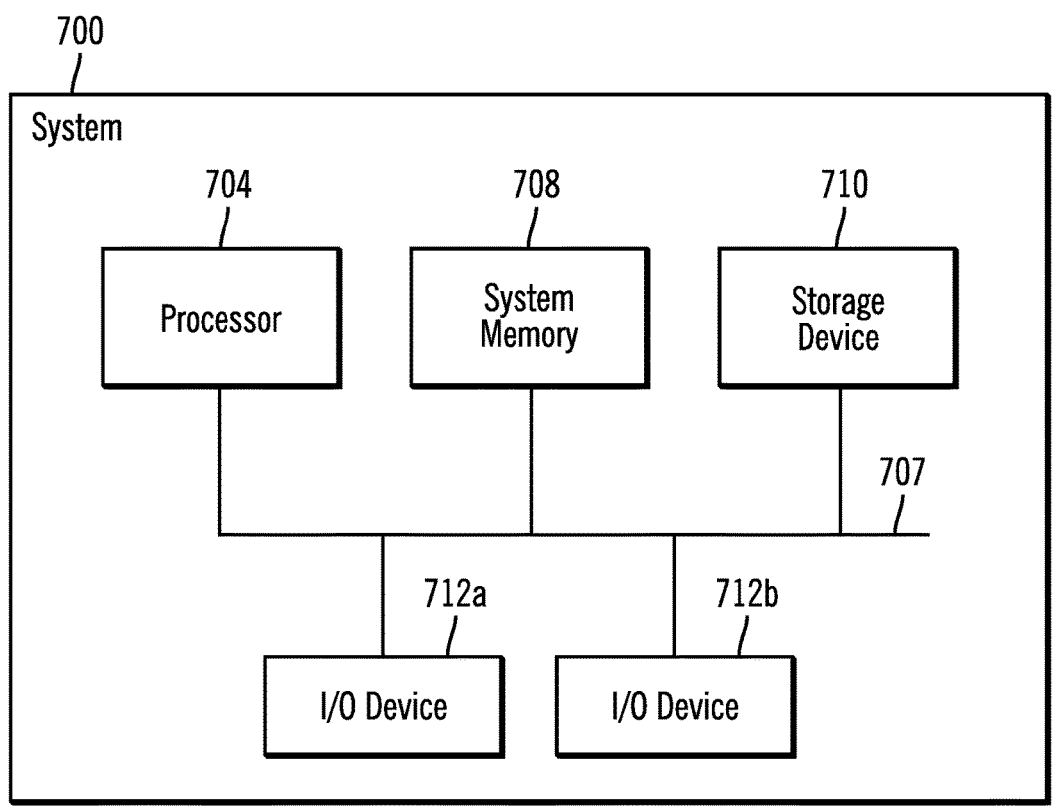
FIG. 7 illustrates an embodiment of a system in which the memory device of FIG. 1 may be deployed.

FIG. 7 illustrates an embodiment of a system 700 in which the non-volatile memory storage device 100 may be deployed as the system memory device 708 and/or a storage device 710. The system includes a processor 704 that communicates over a bus 706 with a system memory device 708 in which programs, operands and parameters being executed are cached, and a storage device 710, which may comprise a solid state drive (SSD) that stores programs and user data that may be loaded into the system memory 708 for execution. The processor 704 may also communicate with Input/Output (I/O) devices 712a, 712b, which may comprise input devices (e.g., keyboard, touchscreen, mouse, etc.), display devices, graphics cards, ports, network interfaces, etc. The memory 708 and storage device 710 may be coupled to an interface on the system 700 motherboard, mounted on the system 700 motherboard, or deployed in an external memory device or accessible over a network.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

The reference characters used herein, such as i, are used to denote a variable number of instances of an element, which may represent the same or different values, and may represent the same or different value when used with different or the same elements in different described instances.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

EXAMPLES

The following examples pertain to further embodiments.

Example 1 is an apparatus connected to a host system for improving quality of service in a storage device, comprising: a non-volatile memory; a buffer to buffer Input/Output ("I/O") commands from the host system to perform with respect to the non-volatile memory; and a memory controller to: maintain information on an input rate at which I/O commands are being added to the buffer and information on an output rate at which I/O commands are processed from the buffer to apply to execute against the non-volatile memory; determine a current level of available space in the buffer; determine an acceptance rate at which I/O commands are added to the buffer from the host system to process based on the input rate, the output rate, the current level of available space, and an available space threshold for the buffer to maintain the buffer at the available space threshold; add I/O commands to the buffer to process based on the acceptance rate; and access the I/O commands from the buffer to process to execute against the non-volatile memory.

In Example 2, the subject matter of examples 1 and 3-9 can optionally include that the acceptance rate is reduced in response to determining that the current level of available space is greater than the available space threshold.

In Example 3, the subject matter of examples 1, 2 and 4-9 can optionally include that the adding the I/O commands to the buffer comprises: pull the I/O commands from a submission queue in the host system to add to the buffer at the acceptance rate.

In Example 4, the subject matter of examples 1-3 and 5-9 can optionally include that the determining the acceptance rate and using the acceptance rate to control a rate at which the I/O commands are added to the buffer are performed in response to determining that available space in the buffer is less than the available space threshold.

In Example 5, the subject matter of examples 1-4 and 6-9 can optionally include that the memory controller is further to: return completion to the host system for each of the I/O command in response to adding the I/O command to the buffer.

In Example 6, the subject matter of examples 1-5 and 7-9 can optionally include that the available space threshold comprises a first available space threshold, further comprising: a secondary buffer, wherein the memory controller is further to: add the I/O commands to the secondary buffer in response to the buffer reaching the first available space threshold; and move the I/O commands in the secondary buffer to the buffer in response to the buffer reaching a second available space threshold greater than the first available space threshold.

In Example 7, the subject matter of examples 1-6 and 8-9 can optionally include that the secondary buffer is located in the non-volatile memory.

In Example 8, the subject matter of examples 1-7 and 9 can optionally include that the non-volatile memory comprises storage dies having storage cells capable of storing multiple bits per storage cell, wherein the memory controller is further to: store a first number of bits per cell in the storage dies; and store a second number of bits per cell in the storage dies having the secondary buffer, wherein the second number of bits per cell is less than the first number of bits per cell.

In Example 9, the subject matter of examples 1 and 2-8 can optionally include that the non-volatile memory to which the I/O commands are directed comprises a first non-volatile memory device, wherein the secondary buffer comprises a second non-volatile memory that is faster access than the first non-volatile memory device.

Example 10 is a system for improving quality of service in a storage device, comprising: a host system; and a non-volatile memory storage device coupled to the host computer, wherein the host computer communicates Input/Output (I/O) requests to the non-volatile memory storage device, comprising: a non-volatile memory; a buffer to buffer Input/Output ("I/O") commands from the host system to perform with respect to the non-volatile memory; and a memory controller to: maintain information on an input rate at which I/O commands are being added to the buffer and information on an output rate at which I/O commands are processed from the buffer to apply to execute against the non-volatile memory; determine a current level of available space in the buffer; determine an acceptance rate at which I/O commands are added to the buffer from the host system to process based on the input rate, the output rate, the current level of available space, and an available space threshold for the buffer to maintain the buffer at the available space threshold; add I/O commands to the buffer to process based on the acceptance rate; and access the I/O commands from the buffer to process to execute against the non-volatile memory.

In Example 11, the subject matter of examples 10 and 12-17 can optionally include that the acceptance rate is reduced in response to determining that the current level of available space is greater than the available space threshold.

In Example 12, the subject matter of examples 10, 11 and 13-17 can optionally include the adding the I/O commands to the buffer comprises: pull the I/O commands from a submission queue in the host system to add to the buffer at the acceptance rate.

In Example 13, the subject matter of examples 10-12 and 14-17 can optionally include that the determining the acceptance rate and using the acceptance rate to control a rate at which the I/O commands are added to the buffer are performed in response to determining that available space in the buffer is less than the available space threshold.

In Example 14, the subject matter of examples 10-13 and 15-17 can optionally include that the available space threshold comprises a first available space threshold, further comprising: a secondary buffer, wherein the memory controller is further to: add the I/O commands to the secondary buffer in response to the buffer reaching the first available space threshold; and move the I/O commands in the secondary buffer to the buffer in response to the buffer reaching a second available space threshold greater than the first available space threshold.

In Example 15, the subject matter of examples 10-14 and 16-17 can optionally include that the secondary buffer is located in the non-volatile memory.

In Example 16, the subject matter of examples 10-15 and 17 can optionally include that the non-volatile memory comprises storage dies having storage cells capable of storing multiple bits per storage cell, wherein the memory controller is further to: store a first number of bits per cell in the storage dies; and store a second number of bits per cell in the storage dies having the secondary buffer, wherein the second number of bits per cell is less than the first number of bits per cell.

In Example 17, the subject matter of examples 10-16 can optionally include that the non-volatile memory to which the I/O commands are directed comprises a first non-volatile memory device, wherein the secondary buffer comprises a second non-volatile memory that is faster access than the first non-volatile memory device.

Example 18 is a method for improving quality of service in a non-volatile memory storage device, comprising: maintaining information on an input rate at which I/O commands are being added to the buffer and information on an output rate at which I/O commands are processed from the buffer to apply to execute against a non-volatile memory; determining a current level of available space in the buffer; determining an acceptance rate at which I/O commands are added to the buffer from a host system to process based on the input rate, the output rate, the current level of available space, and an available space threshold for the buffer to maintain the buffer at the available space threshold; adding I/O commands to the buffer to process based on the acceptance rate; and accessing the I/O commands from the buffer to process to execute against the non-volatile memory.

In Example 19, the subject matter of examples 18 and 20-25 can optionally include that the acceptance rate is reduced in response to determining that the current level of available space is greater than the available space threshold.

In Example 20, the subject matter of examples 18, 19 and 21-25 can optionally include that the adding the I/O commands to the buffer comprises: pulling the I/O commands from a submission queue in the host system to add to the buffer at the acceptance rate.

In Example 21, the subject matter of examples 18-20 and 22-25 can optionally include that the determining the acceptance rate and using the acceptance rate to control a rate at which the I/O commands are added to the buffer are performed in response to determining that available space in the buffer is less than the available space threshold.

In Example 22, the subject matter of examples 18-21 and 23-25 can optionally include that the available space threshold comprises a first available space threshold, further comprising: adding the I/O commands to a secondary buffer in response to the buffer reaching the first available space threshold; and moving the I/O commands in the secondary buffer to the buffer in response to the buffer reaching a second available space threshold greater than the first available space threshold.

In Example 23, the subject matter of examples 18-22 and 24-25 can optionally include that the secondary buffer is located in the non-volatile memory.

In Example 24, the subject matter of examples 18-23 and 25 can optionally include that the non-volatile memory comprises storage dies having storage cells capable of storing multiple bits per storage cell, further comprising: storing a first number of bits per cell in the storage dies; and storing a second number of bits per cell in the storage dies having the secondary buffer, wherein the second number of bits per cell is less than the first number of bits per cell.

In Example 25, the subject matter of examples 18-24 can optionally include that the non-volatile memory to which the I/O commands are directed comprises a first non-volatile memory device, wherein the secondary buffer comprises a second non-volatile memory that is faster access than the first non-volatile memory device.

Example 26 is an apparatus for improving quality of service in a non-volatile memory storage device, comprising: means for maintaining information on an input rate at which I/O commands are being added to the buffer and information on an output rate at which I/O commands are processed from the buffer to apply to execute against a non-volatile memory; means for determining a current level of available space in the buffer; means for determining an acceptance rate at which I/O commands are added to the buffer from a host system to process based on the input rate, the output rate, the current level of available space, and an available space threshold for the buffer to maintain the buffer at the available space threshold; means for adding I/O commands to the buffer to process based on the acceptance rate; and means for accessing the I/O commands from the buffer to process to execute against the non-volatile memory.

Example 27 is an apparatus comprising means to perform a method as claimed in any preceding example.

Example 28 is a machine-readable storage including machine-readable instructions, when executed, to implement a method or realize an apparatus in any preceding example.

What is claimed:

1. An apparatus connected to a host system and to store data in a non-volatile memory, comprising:
    a buffer to buffer Input/Output ("I/O") commands from the host system to perform with respect to the non-volatile memory; and
    a memory controller to:
        maintain information on an input rate comprising a measured rate at which I/O commands are being added to the buffer and information on an output rate comprising a measured rate at which I/O commands are processed from the buffer to apply to execute against the non-volatile memory;
        determine a current level of available space in the buffer;
        determine an acceptance rate at which the memory controller adds I/O commands to the buffer from the host system to process based on the input rate, the output rate, the current level of available space, and an available space threshold for the buffer to maintain the buffer at the available space threshold;
        add I/O commands to the buffer to process based on the acceptance rate; and
        access the I/O commands from the buffer to process to execute against the non-volatile memory.

2. The apparatus of claim 1, wherein the acceptance rate is reduced in response to determining that the current level of available space is greater than the available space threshold.

3. The apparatus of claim 1, wherein the adding to add the I/O commands to the buffer comprises:
    pull the I/O commands from a submission queue in the host system to add to the buffer at the acceptance rate.

4. The apparatus of claim 1, wherein the determining the acceptance rate and using the acceptance rate to control a rate at which the I/O commands are added to the buffer are performed in response to determining that available space in the buffer is less than the available space threshold.

5. The apparatus of claim 1, wherein the memory controller is further to:
    return completion to the host system for each of the I/O commands in response to adding an I/O command to the buffer.

6. The apparatus of claim 1, wherein the available space threshold comprises a first available space threshold, further comprising:
    a secondary buffer,
    wherein the memory controller is further to:
        add the I/O commands to the secondary buffer in response to the buffer reaching the first available space threshold; and
        move the I/O commands in the secondary buffer to the buffer in response to the buffer reaching a second available space threshold greater than the first available space threshold.

7. The apparatus of claim 6, wherein the secondary buffer is located in the non-volatile memory.

8. The apparatus of claim 7, wherein the non-volatile memory comprises storage dies having storage cells capable of storing multiple bits per storage cell, wherein the memory controller is further to:
    store a first number of bits per cell in the storage dies; and
    store a second number of bits per cell in the storage dies having the secondary buffer, wherein the second number of bits per cell is less than the first number of bits per cell.

9. The apparatus of claim 6, wherein the non-volatile memory to which the I/O commands are directed comprises a first non-volatile memory device, wherein the secondary buffer comprises a second non-volatile memory that is faster access than the first non-volatile memory device.

10. A system in communication with a host system, comprising:
    a non-volatile memory storage device coupled to the host system, wherein the host system communicates Input/Output (I/O) requests to the non-volatile memory storage device, comprising:
        a non-volatile memory;
        a buffer to buffer Input/Output ("I/O") commands from the host system to perform with respect to the non-volatile memory; and
        a memory controller to:
            maintain information on an input rate comprising a measured rate at which I/O commands are being added to the buffer and information on an output rate comprising a measured rate at which I/O commands are processed from the buffer to apply to execute against the non-volatile memory;
            determine a current level of available space in the buffer;
            determine an acceptance rate at which the memory controller adds I/O commands to the buffer from the host system to process based on the input rate, the output rate, the current level of available space, and an available space threshold for the buffer to maintain the buffer at the available space threshold;
            add I/O commands to the buffer to process based on the acceptance rate; and
            access the I/O commands from the buffer to process to execute against the non-volatile memory.

11. The system of claim 10, wherein the acceptance rate is reduced in response to determining that the current level of available space is greater than the available space threshold.

12. The system of claim 10, wherein to add the I/O commands to the buffer comprises:
pull the I/O commands from a submission queue in the host system to add to the buffer at the acceptance rate.

13. The system of claim 10, wherein the determining the acceptance rate and using the acceptance rate to control a rate at which the I/O commands are added to the buffer are performed in response to determining that available space in the buffer is less than the available space threshold.

14. The system of claim 10, wherein the available space threshold comprises a first available space threshold, further comprising:
a secondary buffer,
wherein the memory controller is further to:
add the I/O commands to the secondary buffer in response to the buffer reaching the first available space threshold; and
move the I/O commands in the secondary buffer to the buffer in response to the buffer reaching a second available space threshold greater than the first available space threshold.

15. The system of claim 14, wherein the secondary buffer is located in the non-volatile memory.

16. The system of claim 15, wherein the non-volatile memory comprises storage dies having storage cells capable of storing multiple bits per storage cell, wherein the memory controller is further to:
store a first number of bits per cell in the storage dies; and
store a second number of bits per cell in the storage dies having the secondary buffer, wherein the second number of bits per cell is less than the first number of bits per cell.

17. The system of claim 14, wherein the non-volatile memory to which the I/O commands are directed comprises a first non-volatile memory device, wherein the secondary buffer comprises a second non-volatile memory that is faster access than the first non-volatile memory device.

18. A method for a memory controller to add host Input/Output (I/O) commands to a buffer in a non-volatile memory storage device, comprising:
maintaining information on an input rate comprising a measured rate at which I/O commands are being added to the buffer and information on an output rate comprising a measured rate at which I/O commands are processed from the buffer to apply to execute against a non-volatile memory;
determining a current level of available space in the buffer;
determining an acceptance rate at which the memory controller adds I/O commands to the buffer from a host system to process based on the input rate, the output rate, the current level of available space, and an available space threshold for the buffer to maintain the buffer at the available space threshold;
adding I/O commands to the buffer to process based on the acceptance rate; and
accessing the I/O commands from the buffer to process to execute against the non-volatile memory.

19. The method of claim 18, wherein the acceptance rate is reduced in response to determining that the current level of available space is greater than the available space threshold.

20. The method of claim 18, wherein the adding the I/O commands to the buffer comprises:
pulling the I/O commands from a submission queue in the host system to add to the buffer at the acceptance rate.

21. The method of claim 18, wherein the determining the acceptance rate and using the acceptance rate to control a rate at which the I/O commands are added to the buffer are performed in response to determining that available space in the buffer is less than the available space threshold.

22. The method of claim 18, wherein the available space threshold comprises a first available space threshold, further comprising:
adding the I/O commands to a secondary buffer in response to the buffer reaching the first available space threshold; and
moving the I/O commands in the secondary buffer to the buffer in response to the buffer reaching a second available space threshold greater than the first available space threshold.

23. The method of claim 22, wherein the secondary buffer is located in the non-volatile memory.

24. The method of claim 23, wherein the non-volatile memory comprises storage dies having storage cells capable of storing multiple bits per storage cell, further comprising:
storing a first number of bits per cell in the storage dies; and
storing a second number of bits per cell in the storage dies having the secondary buffer, wherein the second number of bits per cell is less than the first number of bits per cell.

25. The method of claim 22, wherein the non-volatile memory to which the I/O commands are directed comprises a first non-volatile memory device, wherein the secondary buffer comprises a second non-volatile memory that is faster access than the first non-volatile memory device.

* * * * *